United States Patent
Hoffmann

(10) Patent No.: US 7,588,631 B2
(45) Date of Patent: Sep. 15, 2009

(54) VACUUM DEAERATOR

(75) Inventor: Jeffrey R. Hoffmann, Fairfield, OH (US)

(73) Assignee: The Western States Machine Company, Hamilton, OH (US)

( * ) Notice: Subject to any disclaimer, the term of this patent is extended or adjusted under 35 U.S.C. 154(b) by 639 days.

(21) Appl. No.: 11/354,408

(22) Filed: Feb. 15, 2006

(65) Prior Publication Data

US 2007/0186772 A1 Aug. 16, 2007

(51) Int. Cl.
*B01D 19/00* (2006.01)

(52) U.S. Cl. .............................. 96/196; 96/217; 95/261; 426/487

(58) Field of Classification Search ................... 95/261, 95/266; 96/196, 217; 264/8; 425/8; 65/21.2; 426/487, 488

See application file for complete search history.

(56) References Cited

U.S. PATENT DOCUMENTS

| | | | |
|---|---|---|---|
| 2,060,242 A * | 11/1936 | Pulley | ........................ 96/196 |
| 3,932,150 A | 1/1976 | Komai et al. | |
| 4,345,920 A | 8/1982 | Ross | |
| 4,971,660 A | 11/1990 | Rivers, Jr. | |
| 5,165,237 A | 11/1992 | Athey et al. | |
| 5,297,389 A | 3/1994 | Athey et al. | |
| 5,343,705 A | 9/1994 | Athey et al. | |
| 6,482,254 B1 | 11/2002 | Bono et al. | |
| 6,884,281 B2 | 4/2005 | Takahashi | |
| 2003/0233937 A1 | 12/2003 | Martel | |
| 2004/0173093 A1 | 9/2004 | Takahashi | |

FOREIGN PATENT DOCUMENTS

| | | | |
|---|---|---|---|
| JP | 56076214 A | * | 6/1981 |
| JP | 56100610 A | * | 8/1981 |
| JP | 60054714 A | * | 3/1985 |
| JP | 60054716 A | * | 3/1985 |

\* cited by examiner

*Primary Examiner*—Duane Smith
*Assistant Examiner*—Douglas J Theisen
(74) *Attorney, Agent, or Firm*—Dinsmore & Shohl LLP

(57) ABSTRACT

Vacuum deaerators and methods of using for deaeration comprise a vessel having side walls and a cover. The vacuum deaerator further comprises at least one vacuum source coupled to the vessel, and an open-ended distributor plate comprising outer edges spaced from the walls of the vessel. Additionally, the vacuum deaerator comprises a drive shaft configured to rotate the distributor plate, and at least one feed port configured to provide a liquid comprising entrained gases to a surface of the distributor plate. The distributor plate is configured to deaerate the liquid by substantially removing entrained gases from the liquid through the application of centrifugal force.

15 Claims, 3 Drawing Sheets

VACUUM DEAERATOR

FIELD OF THE INVENTION

The present invention is generally directed to vacuum deaerators, and is specifically directed to vacuum deaerators operable to remove entrained gases from liquids regardless of shear sensitivity.

BACKGROUND OF THE INVENTION

Vacuum deaerators are known mechanisms for the separation of liquids and gases. Specifically, vacuum deaerators separate entrained gases contained in the liquids, in part by extending the surface area of the liquid. Entrained gases, for example, air bubbles, may become entrained in liquids for numerous reasons. For instance, applications that require mixing a finely divided solid in a liquid may generate air bubbles. The gases, which are adsorbed to the surface of the solids or contained in the interstitial spaces of the solids, are released into the liquid, thus resulting in entrained gases in the liquid. The stability of the air bubbles in the liquid depends on product viscosity and surface tension.

Deaeration of liquid compositions is desirable for various reasons. First, deaeration may improve the aesthetic look and feel of a product. Entrained air can make a liquid unsightly due to pockmarks or foam; thus, many value-added food, pharmaceutical, and cosmetic products are deaerated for appearance sake alone. Second, deaeration may also ensure product usability. Chemical products such as epoxies, caulking compounds, and adhesives often need to be deaerated for effective ease of application and even coating. Third, deaeration ensures proper volumetric filling of containers. Volumetric filling of liquids is unreliable if the density of the product is inconsistent. During filling, entrained air may cause liquid splattering due to escaping air "burping" as the liquid is expelled from the filling nozzle into the container. Fourth, deaeration aids transport of chemicals. Many bulk chemicals cannot be easily pumped because of compression or cavitation due to entrained air. This problem plagues many pumps, e.g., centrifugal and positive displacement pumps, thus removal of entrained gases is desirable. Fifth, deaeration may facilitate improved product storage. For instance, deaerated or foaming products may cause various problems in bulk storage by yielding false readings to various types of level indicators. Sixth, deaeration improves product stability and shelf life. Many liquid products oxidize or degrade due to the presence of oxygen or carbon dioxide. As a result, removing entrained air can increase the stability of many food and chemical products.

Referring to FIGS. 1 and 3, the Fryma/Koruma® ("Koruma") continuous vacuum deaerator 100, a known deaerator distributed by Fryma/Koruma®, is shown schematically. The Koruma deaerator 100 comprises a conical shaped vessel 102 with a cover 103 and side walls 104. The Koruma deaerator 100 comprises a liquid feed port 110 mounted into the cover 103, and extending downward into the distributor plate 130, and further comprises a drive shaft 180. As shown in FIGS. 1 and 3, the distributor plate 130 comprises screens 132, typically three screens, having 1 mm to 3 mm holes. The plate 130 further comprises a seal 140 disposed in the liquid flowpath and configured to ensure that liquid is dispersed only through the screens 132. The Koruma deaerator 100 atomizes the liquid into thousands of droplets by forcing the liquid through the screen 132 holes of the distributor plate 130, thereby extending the surface area and removing air bubbles from the liquid. The entrained gases, or air bubbles, are removed from the vessel by a vacuum 120 having a conduit mounted in the cover 103, and comprising a vacuum pump 124 and a vacuum line 122. The deaerated liquid is delivered out of the vessel 102 via the product discharge tube 160. Although capable of removing air bubbles, the Koruma deaerator 100 imparts shear to the liquid as the product is forced through the screens 132.

Referring to FIG. 2, components of the Cornell Versator® 200, a known deaerator distributed by the Cornell Machine Company, are shown schematically. The Versator 200 comprises an elliptical disc distributor plate 220, and a feed port 210 providing a liquid feed near the center of the distributor plate 220. Rotated by the drive shaft 280, the distributor plate 220 exerts a centrifugal force on the entrained liquid thus spreading it out along the surface of the plate 220. Upon deaeration, a stationary pick-up tube 240 removes the deaerated liquid, which collects on the outer edge of the plate 220. The Cornell Versator generates high shear due to the high differential speed between the plate 220 and the stationary pickup tube 240.

Vacuum deaerators are process is utilized in the manufacture of various products in numerous industries, for example, the chemical, food cosmetics, and pharmaceutical industries. As product demands increase in these industries, the need arises for improvements in vacuum deaerators and components thereof.

SUMMARY OF THE INVENTION

In a first embodiment of the present invention, a vacuum deaerator is provided. The vacuum deaerator comprises a vessel comprising side walls and a cover, and at least one vacuum source coupled to the vessel. The vacuum deaerator further comprises an open ended distributor plate comprising outer edges spaced from the walls of the vessel, a drive shaft configured to rotate the distributor plate, and at least one feed port configured to provide a liquid comprising entrained gases to a surface of the distributor plate. The distributor plate is configured to deaerate the liquid by substantially removing entrained gases from the liquid through the application of centrifugal force to the thin film of liquid that forms on the distributor plate.

In a second embodiment, the vacuum deaerator comprises a vessel comprising side walls and a cover, and at least one vacuum source coupled to the vessel. The vacuum deaerator further comprises an open-ended distributor plate defining an inverted bowl shape and comprising outer edges spaced from the walls of the vessel. The vacuum deaerator comprises a drive shaft disposed between the distributor plate and the vessel cover, wherein the drive shaft is configured to rotate the distributor plate. The vacuum deaerator also comprises at least one feed port coupled to the walls of the vessel and configured to provide a liquid comprising entrained gases onto a surface of the distributor plate opposite the drive shaft. The distributor plate is configured to deaerate the liquid by substantially removing entrained gases from the liquid through the application of centrifugal force to the thin film of liquid that forms on the distributor plate.

In a third embodiment of the present invention, a method of deaerating a liquid is provided. The method comprises providing a vacuum deaerator comprising a vessel comprising side walls and a cover, and at least one vacuum source coupled to the vessel. The vacuum deaerator further comprises an open-ended distributor plate having outer edges spaced from the walls of the vessel, a drive shaft configured to rotate the distributor plate, and at least one feed port. The method further comprises feeding a liquid comprising entrained gases to a surface of the distributor plate. The method includes deaerating the liquid by substantially removing entrained gases from the liquid through application of centrifugal force, wherein the centrifugal force forms a thin deaerated film by spreading the liquid over the surface of the distributor plate. Additionally, the method comprises dispensing the deaerated film from the distributor plate though the spaces between the distributor plate and the vessel wall.

Additional features and advantages provided by embodiments of the present invention will be more fully understood in view of the following detailed description in conjunction with the drawings.

BRIEF DESCRIPTION OF THE DRAWINGS

The following detailed description of the embodiments of the present invention can be best understood when read in conjunction with the following drawings, where like structure is indicated with like reference numerals and in which.

DETAILED DESCRIPTION

Figure 4:
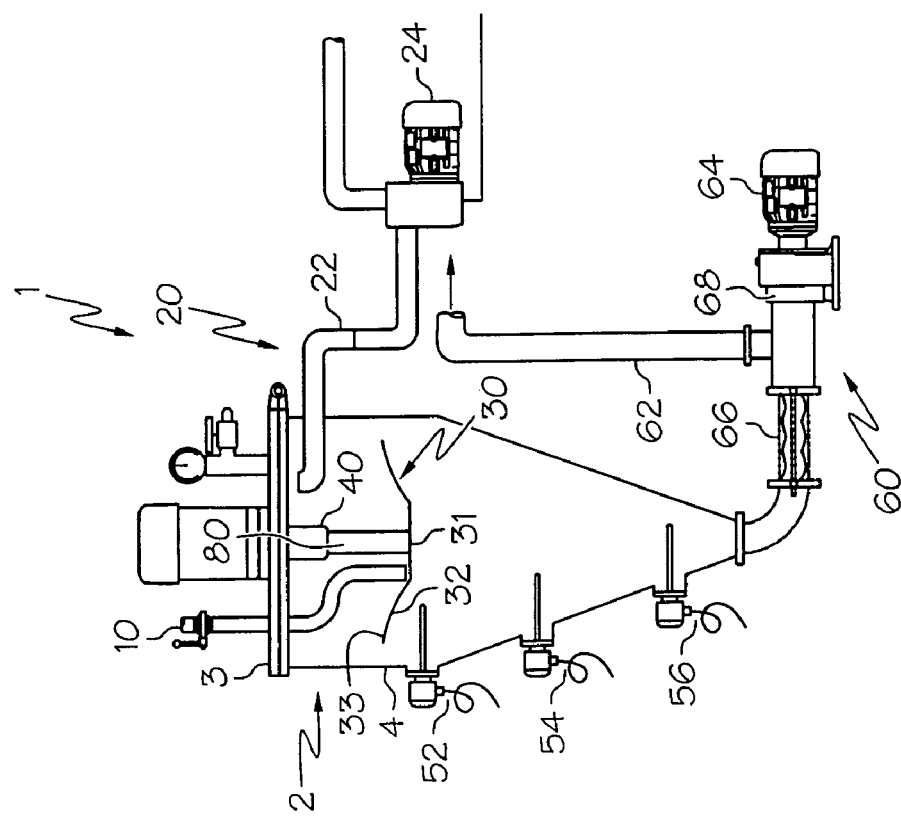
FIG. 4 is a schematic view of a vacuum deaerator according to one or more embodiments of the present invention.
Figure 1:
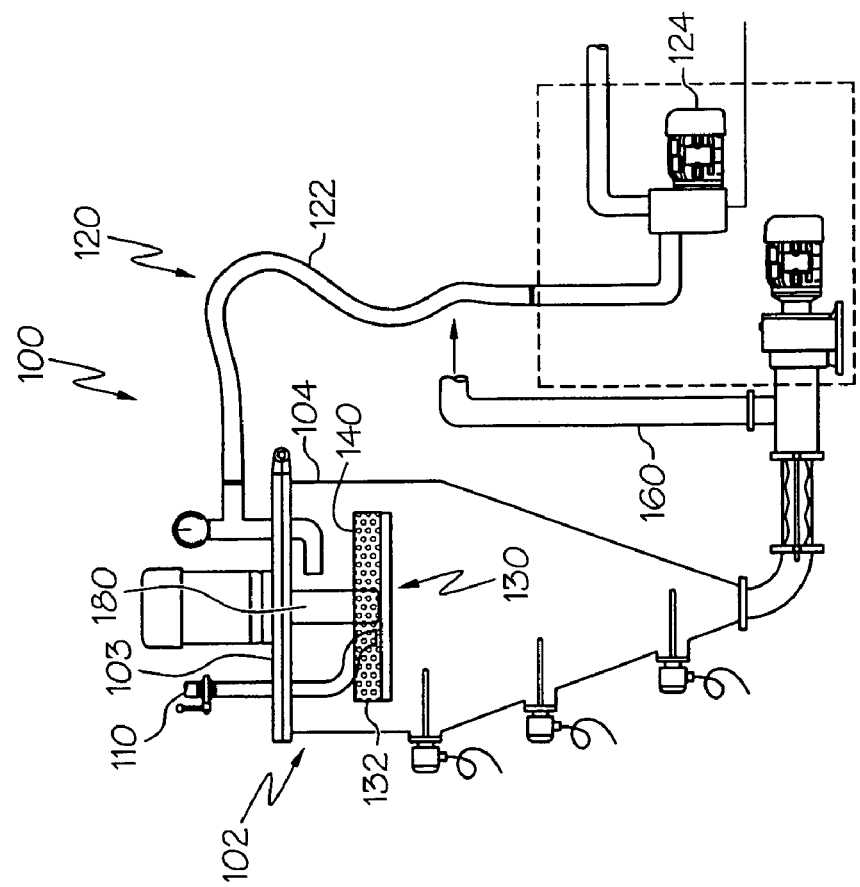
FIG. 1 (Prior Art) is a schematic view of a known vacuum deaerator.
Figure 2:
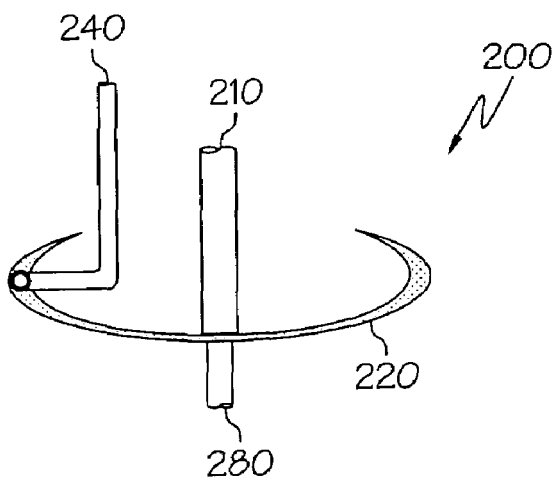
FIG. 2 (Prior Art) is a schematic view of a known distributor plate used in vacuum deaerators.
Figure 3:
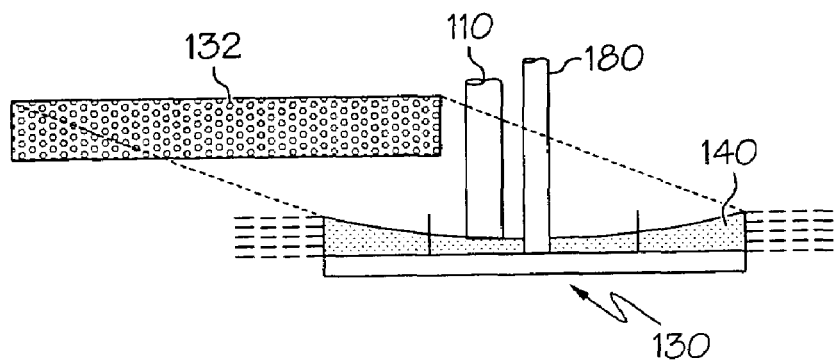
FIG. 3 (Prior Art) is another schematic view of a known distributor plate used in vacuum deaerators.

Referring to an embodiment as shown in FIG. 4, a vacuum deaerator 1 is provided. The vacuum deaerator 1 is suitable to run continuously or in batch processes. The vacuum deaerator 1 comprises a vessel 2 comprising side walls 4 and a cover 3. Regardless of the vessel 2 shape, the walls 4 encompass the side portions of the vessel 2, and the cover 3 may be coupled to the top and/or bottom portions of the vessel 2. Referring to FIG. 4, vessel 2 may comprise a substantially conical shape; however, other suitable vessel 2 shapes known to one skilled in the art are possible. Similarly, the vessel 2 may also comprise various suitable materials. The vessel 2 materials may include but are not limited to, carbon steel, stainless steel, or various alloys such as nickel or aluminum based alloys. Referring to FIG. 4, the vessel 2 may be a gravitational vessel, wherein a liquid is configured to flow downwardly through the vessel 2 due in part to gravitational forces. The vacuum deaerator 1 further comprises at least one vacuum source 20 coupled to the vessel 2. In one embodiment, the vacuum source 20 comprises a vacuum pump 24 and a vacuum line 22. Referring to FIG. 4, the vacuum line 22 may be coupled to a side wall 4 of the vessel 2. Other configurations and locations for the vacuum line 22, for example, mounting the vacuum line on the upper cover 3, are also contemplated herein. When the vacuum line 22 is attached to the upper cover, at least part of the vacuum line 22 must be flexible. This may require a flexible hose. Referring to FIG. 4, a substantially rigid line 22 coupled to an inlet in the side wall provides increased integrity to the vacuum source 20, and reduces the likelihood of contamination or leaks in the vacuum line 22.

Figure 5A:
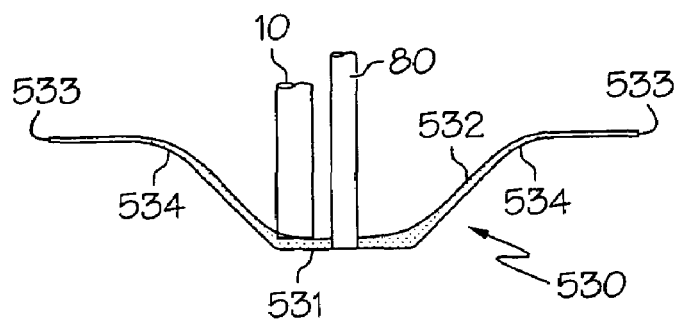
FIG. 5a is a schematic view of a distributor plate according to one or more embodiments of the present invention.
Figure 5B:
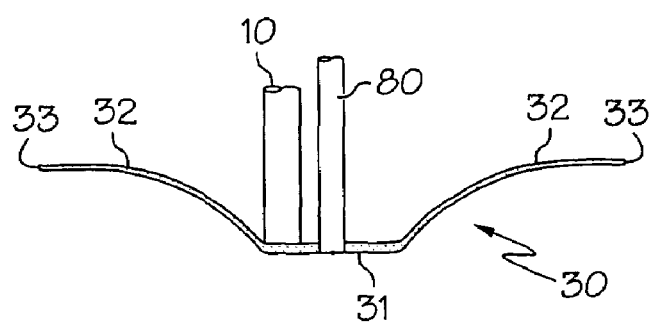
FIG. 5b is another schematic view of a distributor plate according to one or more embodiments of the present invention.

The vacuum deaerator 1 further comprises an open-ended distributor plate 30 comprising outer edges 33 spaced from the walls 4 of the vessel 2. As used in this application, "open ended" signifies that there is a space between the outer edges 33 of the distributor plate 30 and the vessel wall 4. The plate 30 may comprise numerous shapes known to one skilled in the art. The distributor plate 30 may define a disc shape, a bowl shape, an inverted disc shape or an inverted bowl shape. In one exemplary embodiment as shown in FIGS. 4 and 5b, the distributor plate 30 may comprise a flat bottom surface 31 and substantially curved walls 32 extending upwardly or downwardly from the bottom surface 31. Although only flat bottom surfaces 31 are shown, curved bottom surfaces are also contemplated herein. In another exemplary embodiment as shown in FIG. 5a, the distributor plate 530 may comprise a flat bottom surface 531 and substantially straight walls 532 extending angularly upwardly or downwardly from the bottom surface 531. In a further embodiment as shown in FIG. 5b, the distributor plate 30 may comprise a flat bottom surface 31 and substantially curved walls 32 having curved upper edges or straight upper edges 33. As shown in FIG. 5a, the straight walls 532 may comprise a curved junction point 534, which connects the substantially straight walls 532 to the substantially straight edges 533. The walls 532 may extend upwardly or downwardly from the bottom surface 531 at any suitable angle less than 90° from horizontal. For example, the walls 532 may extend upwardly or downwardly at an angle ranging from about 10° to about 60° from horizontal. Similar to the vessel 2, the distributor plates 30 and 530 may comprise carbon steel, stainless steel, or other alloys. Additionally, the distributor plates 30 and 530 may also comprise rigid polymers. Rigid polymer materials may include, but are not limited to, polytetrafluoroethylene (PTFE) and polyethylene materials such as UHMW polyethylene.

Figure 6:
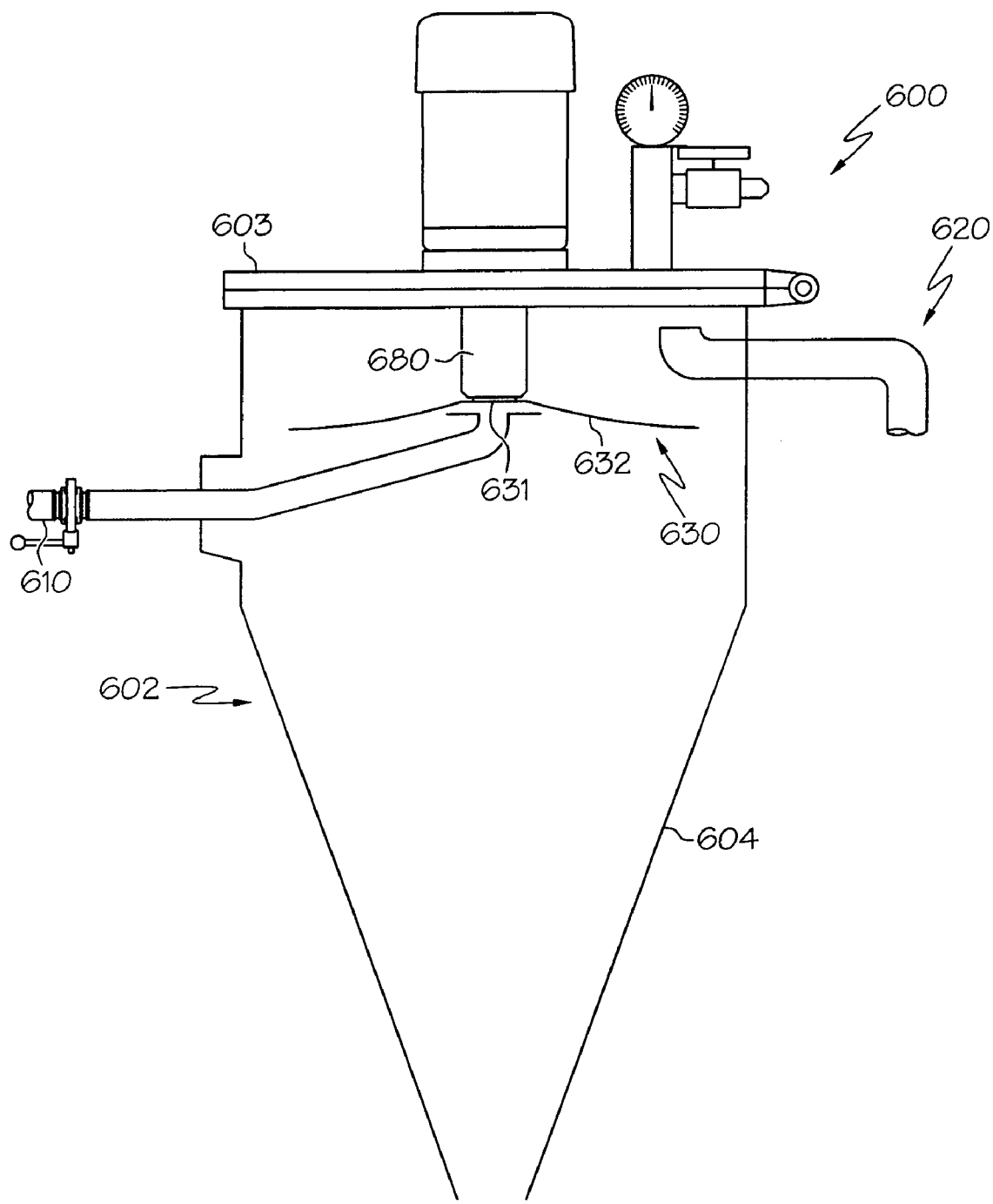
FIG. 6 is a schematic view of a vacuum deaerator comprising an inverted distributor plate according to one or more embodiments of the present invention.

Referring generally to FIGS. 5a, 5b and 6, the dimensions of the distributor plate may vary greatly, and numerous sizes and shapes are contemplated herein. For instance, maximizing the depth and/or steepness of the plate walls will enable the distributor plate to retain the liquid for a longer residence time, thereby facilitating a more thorough deaeration process. Furthermore, maximizing the diameter of the distributor plate would maximize the surface area of the thin film produced on the plate, thereby also improving deaeration. In some exemplary embodiments, the plate comprises a diameter of up to about 50 inches, or specifically about 10 to about 40 inches in diameter.

Referring to FIG. 4, the vacuum deaerator 1 comprises at least one feed port 10 configured to provide a liquid comprising entrained gases to a surface of the distributor plate 30. In an exemplary embodiment, the feed port 10 is configured to deliver the entrained liquid to a location at or near the center of the distributor plate 30. In accordance with other embodiments, the feed port 10 may be disposed within the cover 3 of the vessel 2, or on a wall 604 of the vessel 602 as shown in FIG. 6. The vacuum deaerator 1 further comprises a drive shaft 80 configured to rotate the distributor plate 30. Referring to FIG. 4, the drive shaft 80 may be located between the distributor plate 30 and the vessel cover 3.

In another embodiment, the deaerator 1 further comprises a seal 40 coupled to an upper portion of the drive shaft 80, wherein the seal 40 is separated from the liquid flowpath provided by the feed port 10. The seal may comprise any suitable seal known to one skilled in the art. In one embodiment, the seal 40 may comprise a dry-running single-acting mechanical seal. Such dry running seals may comprise various materials on the seal faces, such as carbon, ceramics, carbide, for example, ceramic carbide or tungsten carbide, and combinations thereof. Moving the seal away from the path of liquid flow results in easier cleaning, because the seal 40 will not accumulate liquid. Thus, the need to purge the seal 40 after a deaeration process is eliminated. Moreover, in a further embodiment, the distributor plate 30 may comprise drain holes (not shown) configured to remove liquid accumulated on the plate 30, and facilitate easier cleaning of the plate 30.

In additional embodiments of the present invention, the deaerator 1 may further comprise a product discharge apparatus 60 configured to remove a deaerated liquid from the vessel 2. The product discharge apparatus 60 comprises a product discharge port 62 coupled to the vessel 2, and a product discharge pump 64 coupled to the product discharge port 62. The product discharge apparatus 60 may further comprise an additional seal 68, for example, a shaft seal, and a reverse pressurized pump 66 configured to exert pressure on the seal 68. The pump 66 exerts pressure on the seal 68 to prevent air bubbles from being reintroduced into the deaerated liquid upon removal from the vessel 2. Many suitable pumps are contemplated herein, for example, a progressive cavity pump commercially available from Moyno. Furthermore, the deaerator 1 may also comprise at least one probe configured to determine a liquid level inside the vessel 2. Referring to one embodiment as shown in FIG. 4, the deaerator may comprise a high level probe 52, a mid-level probe 54, and a low level probe 56. Such probes may be utilized in the continuous vacuum deaerator to regulate liquid flow and liquid levels inside the vessel.

In operation, the feed port 10 delivers a gas-entrained liquid to a surface of the distributor plate 30. Upon rotation by the drive shaft 80, the distributor plate 30 applies a centrifugal force to the liquid. The centrifugal force expands the surface area of the liquid by spreading the liquid over the surface of the distributor plate 30. This results in the formation of a thin liquid film enhancing the removal of entrained gases. The centrifugal force then expels the deaerated liquid from the distributor plate 30 through the spaces between the edges 33 of the distributor plate 30 and the vessel walls 4. In essence, the deaerated liquid film literally spills over the edges 33 of the distributor plate 30. Upon spilling over, the deaerated film may contact the vessel wall 4, wherein contacting the wall 4 may constitute a secondary deaeration device. Referring to FIG. 4, the deaerated liquid is then removed from the vessel 2 through the product discharge apparatus 60. The product discharge pump 64 forces the deaerated liquid out of the vessel through product discharge port 62. The seal 68 and reverse pressurized pump 66 prevent reintroduction of entrained gases into the deaerated liquid upon removal from the vessel 2.

By dispensing the deaerated liquid film over the edges 33 of the plate 30, the vacuum deaerator substantially reduces any shear directed to the deaerated liquid film. The design of vacuum deaerator 1 does not implicate the differential speed or atomization issues associated with other deaerators. As a result, the distributor plate 30 is operable to remove entrained gases from shear sensitive liquid compositions comprising emulsions, gels, friable materials, or combinations thereof. As used herein, "shear sensitive" denotes liquid compositions whose properties may be degraded, at least partially, due to shear. In contrast, shear benefits deaeration of some liquid compositions by aiding in the removal of entrained gases, or reducing the viscosity of other compositions (thixotropic or pseudoplastic). Embodiments of the present invention are operable to remove entrained gases from all types of entrained liquids, regardless of shear sensitivity.

Many factors play a role in deaeration. These factors may include, but are not limited to, viscosity, rheological behavior, and surface tension. The more viscous the liquid, the more centrifugal force is needed to spread the product and expose the surface area. If the product is thixotropic, less force will be required to spread a liquid; however, the surface tension of the liquid may affect the ability to release entrained gases when the liquid is spread out.

The centrifugal force depends on the radial velocity of the distributor plate. The following equation—velocity(feet/minute)=($\pi$×diameter(feet)×revolutions/minute)—illustrates the direct relationship between velocity and rotation. For example, the rotational speed of the plate may range up to about 4000 feet per minute, or in another embodiment about 500 to about 3000 feet per minute. This would correspond to about 300 to 900 rpm for a 12 inch diameter bowl, or about 100 to 300 rpm for a 36 inch diameter bowl. Shear sensitive products such as latex suspensions would require slower speeds to remove the entrained gases, for example, about 500 feet per minute or less, while avoiding product degradation.

Referring to an exemplary embodiment as shown in FIG. 6, a vacuum deaerator 600 is provided. The vacuum deaerator 600 comprises a vessel 602 comprising side walls 604 and a cover 603, and at least one vacuum source 620 coupled to the vessel 602. The deaerator 600 comprises an open-ended distributor plate 630 defining an inverted bowl shape with outer edges 632 spaced from the walls 604 of the vessel 602. The deaerator 600 comprises a drive shaft 680 disposed between the distributor plate 630 and the vessel cover 603, wherein the drive shaft 680 rotates the distributor plate 630. As shown in FIG. 6, the distributor plate 630 may comprise a base component 631, and substantially curved walls 632 extending downwardly from the base component 631. The drive shaft 680 may coupled to the distributor plate 630 on a surface of the base component 631. The deaerator 630 further comprises at least one feed port 610 coupled to the walls 604 of the vessel 602. The feed port 610 is configured to provide a liquid comprising entrained gases onto a surface of the base component 631 of the distributor plate 630 opposite the drive shaft 680. The distributor plate 630 is configured to substantially remove entrained gases from the liquid by applying a centrifugal force to the liquid.

This inverted plate configuration 630 may provide many benefits. By feeding the entrained liquid on a plate 630 surface opposite the drive shaft 680, the entrained liquid does not contact the drive shaft 680. As a result, liquid contact with the deaerator's moving parts is limited to the distributor plate 630, thereby resulting in a more sanitary deaeration process. This is especially desirable in industries, such as the food and pharmaceutical industries that are heavily regulated by the USDA and the FDA. Moreover, this configuration facilitates easier cleaning of the deaerator 600, because there will be substantially no accumulation of liquid on the drive shaft 680. Furthermore, the inverse shaped plate 630 is self-cleaning, because the liquid will not accumulate on the plate due in part to gravitational forces.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A vacuum deaerator comprising:
a vessel comprising side walls and a cover;
at least one vacuum source coupled to the vessel;
an open-ended distributor plate defining an inverted bowl shape and comprising outer edges spaced from the walls of the vessel, wherein the inverted bowl shape comprises a base component and substantially curved walls extending from the base component;
a drive shaft disposed between the distributor plate and the vessel cover and coupled to the distributor plate on a surface of the base component, the drive shaft being configured to rotate the distributor plate; and
at least one feed port coupled to the walls of the vessel and configured to provide a liquid comprising entrained gases onto a surface of the base component of the distributor plate opposite the drive shaft,
wherein the distributor plate is configured to deaerate the liquid by substantially removing entrained gases from the liquid through application of centrifugal force.

2. A vacuum deaerator according to claim 1 further comprising a seal coupled to an upper portion of the drive shaft.

3. A vacuum deaerator according to claim 1 wherein the vacuum source comprises a vacuum pump and a vacuum line.

4. A vacuum deaerator according to claim 1 wherein the vacuum source is coupled to a side wall of the vacuum deaerator.

5. A vacuum deaerator according to claim 1 wherein the vacuum source is configured to purge entrained gases from the vessel after deaeration.

6. A vacuum deaerator according to claim 1 wherein the distributor plate comprises a diameter of about 10 to about 40 inches in diameter.

7. A vacuum deaerator according to claim 1 wherein the distributor plate defines a bowl shape and comprises a flat bottom surface and substantially curved walls extending downwardly from the bottom surface.

8. A vacuum deaerator according to claim 1 wherein the distributor plate defines a bowl shape and comprises a flat bottom surface and substantially straight walls extending downwardly from the bottom surface.

9. A vacuum deaerator according to claim 1 wherein the distributor plate defines a bowl shape and comprises a flat bottom surface and substantially straight walls having curved or straight upper edges, the walls of the bowl extending downwardly from the bottom surface.

10. A vacuum deaerator according to claim 1 wherein the distributor plate comprises drain holes.

11. A vacuum deaerator according to claim 1 wherein the feed port is configured to deliver the entrained liquid to a substantially central location of a distributor plate.

12. A vacuum deaerator according to claim 1 wherein the feed port is disposed on a wall of the vessel.

13. A vacuum deaerator according to claim 1 further comprising a product discharge apparatus comprising,
a product discharge port coupled to the vessel; and
a product discharge pump coupled to the product discharge port;
wherein the product discharge apparatus is configured to remove a deaerated liquid from the vessel through the product port.

14. A vacuum deaerator according to claim 13 wherein the product discharge apparatus further comprises a product discharge seal, and a reverse pressurized pump acting thereon, wherein the seal and reverse pressurized pump are configured to prevent the introduction of entrained gases into the deaerated liquid upon removal.

15. A vacuum deaerator according to claim 1 further comprising at least one probe configured to determine a liquid level inside the vessel.

* * * * *

UNITED STATES PATENT AND TRADEMARK OFFICE
CERTIFICATE OF CORRECTION

PATENT NO.       : 7,588,631 B2                                           Page 1 of 1
APPLICATION NO.  : 11/354408
DATED            : September 15, 2009
INVENTOR(S)      : Jeffrey R. Hoffmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Twenty-first Day of September, 2010

David J. Kappos
*Director of the United States Patent and Trademark Office*